United States Patent Office 2,816,144
Patented Dec. 10, 1957

2,816,144

PRODUCTION OF BENZALDEHYDE

Robert W. Harris, Hillsborough Township, Somerset County, N. J.

No Drawing. Application August 4, 1955, Serial No. 526,574

8 Claims. (Cl. 260—599)

The present invention relates to a process for the production of benzaldehyde from toluene. More particularly, it relates to a process wherein toluene is reacted with chlorine and hydrolyzed to produce benzaldehyde free from chlorine.

The chlorination of toluene will result in the introduction of one, two or three chlorine atoms in the methyl side chain. The alpha-mono-chloro-toluene (benzyl chloride) upon hydrolysis will yield benzyl alcohol, the benzal chloride will yield benzaldehyde, and the benzotrichloride upon hydrolysis will produce benzoic acid. Accordingly, in the preparation of benzaldehyde from toluene by chlorination, it is desirable that only a limited amount of benzotrichloride is formed.

Heretofore in the preparation of benzaldehyde, toluene has been chlorinated to a mixture of the di-chloro and tri-chloro derivatives in the approximate ratio of about 4 to 1 or higher. The chlorination product was run into a slurry of calcium carbonate in water to thereby convert the di-chloro derivative to benzaldehyde and the tri-chloro derivative to calcium benzoate, the benzaldehyde being steam distilled and the calcium benzoate being acidified to form benzoic acid. An alternate method of effecting the hydrolysis was to employ the use of sulphuric acid or water to form benzaldehyde and benzoic acid.

In all of these procedures, however, an appreciable quantity of the toluene was ultimately converted to benzoic acid rather than benzaldehyde because of the high degree of chlorination. In addition, both the benzaldehyde and benzoic acid fractions are more or less contaminated with derivatives containing chlorine in the benzene ring.

It is accordingly an object of the present invention to provide a process for the preparation of benzaldehyde from toluene by chlorination and subsequent hydrolysis wherein but little of the toluene is converted into benzoic acid.

It is a further object of the present invention to provide a process for the preparation of benzaldehyde which is free from nuclear or side chain chlorine.

Another object of the invention is to provide a process for the chlorination of toluene wherein benzal chloride is formed to an appreciable extent while avoiding the formation of benzotrichloride as well as ring chlorinated derivatives of toluene.

It has now been found that if toluene is chlorinated until no more than about 35% has been converted to benzal chloride substantially none of the toluene will have been converted to the tri-chloro derivative. Upon distillation of the reaction mixture any unreacted toluene will first boil off followed by the benzyl chloride. The final fraction will contain benzal chloride possibly admixed with a small amount of the tri-chloro derivative.

The unreacted toluene and benzyl chloride may be recycled for further chlorination while the benzal chloride fraction is preferably redistilled to yield benzal chloride of 97 to 98% purity.

The benzal chloride is hydrolyzed to benzaldehyde in conventional manner and the hydrolysis mass is heated until completely free of any side chain chlorine derivatives. This can be determined by the use of alcoholic silver nitrate, for example, which will form a cloudy precipitate upon contact with compounds containing a side chain chlorine group.

The benzaldehyde which is obtained upon hydrolysis separates from the aqueous layer and upon washing and fractionating yields a substantially pure compound which is totally free from chlorine.

The chlorination of toluene is essentially a step-wise reaction and thus the chlorination can be terminated before more than two or three percent is converted to the tri-chloro derivative. This will correspond to a benzal chloride content of no more than about 35%, depending upon the particular conditions of the reaction, the balance being benzyl chloride with a minor amount of unreacted toluene. Consequently, the reaction is terminated far short of the maximum formation of benzal chloride so that substantially none of the toluene is lost through the formation of the tri-chloro derivative. In spite of the fact that only about one-third of the toluene is converted to the desired material the process is economical in that the balance of the materials may be recycled while substantially none of the less valuable benzoic acid is formed.

The toluene should be dry, of high grade suitable for side chain chlorination and substantially pure, i. e., free from sulphur compounds, paraffins, etc. Nitration grade toluene is a suitable starting material. The chlorination is effected in the liquid phase with dry chlorine which may be bubbled into the toluene. Ultra-violet light, possibly with the addition of other materials usch as phosphorus trichloride, may be used to catalyze the reaction although preferably no such additions are employed. The reaction is preferably conducted at the boiling point of the toluene with moderate reflux and under all circumstances the use of metal containing catalysts or equipment is avoided since they catalyze ring chlorination of the toluene. In producing benzaldehyde which is free from chlorine, it is essential that such ring chlorination be avoided since several of the possible ring chlorinated compounds will boil at a temperature so close to the boiling point of benzaldehyde that they cannot economically be separated by distillation. Accordingly, plastic or glass reaction vessels are employed.

In conducting the chlorination, when about 10% of the toluene has been converted to the di-chloro derivative there will be about 45% of mono-chloro derivative, the balance being unreacted toluene. When 35% of the toluene has been converted to the di-chloro derivative there will be about 55% to about 65% of the mono-chloro derivative. Possibly 2 to 3% of the tri-chloro derivative may be present. As the proportion of the di-chloro derivative increases the proportion of the tri-chloro derivative will likewise increase and it is thus desirable that chlorination be terminated when as large an amount of benzal chloride has been formed without formation of any appreciable amount of the tri-chloro derivative. Accordingly, the chlorination is generally terminated when about 5% to 35% and preferably 10% to 30% of the toluene has been converted to benzal chloride.

In effecting the distillation the unreacted toluene may be removed at reduced pressures. Upon increasing the vacuum to about 1 to 10 mm. the benzyl chloride can be boiled off leaving the desired benzal chloride. This latter is preferably redistilled at a pressure of about 1 or 10 mm. to yield substantially pure benzal chloride free from nuclear chlorine atoms. The hydrolysis may be effected with aqueous sulphuric acid, steam plus zinc compounds, or water. The benzaldehyde separates from the aqueous layer and is preferably neutralized or washed with alkali such as dilute soda ash prior to being fractionated. A distillate is obtained free from nuclear and side chain chlorine atoms.

The following examples illustrate several processes which have been found suitable in the practice of the invention:

*Example I*

One liter (approximately 865 grams) of freshly distilled nitration grade toluene was placed in a two liter glass flask equipped with a high speed agitator, a gas inlet, reflux condenser and a quartz U. V. lamp. Heat was applied until toluene was refluxing and dried chlorine gas run in, slowly at first and gradually increased as the reaction proceeded. The flow was set at a maximum permitted by the capacity of the condenser, but at all times held beneath the point at which any free chlorine passed through the liquid.

After twelve hours flow of gas and periodically thereafter, samples were drawn and tested for specific gravity. When the gravity read about 1.16 at room temperature, the gas was cut off and the slightly yellowish liquid allowed to cool while exposed to the U. V. light until colorless.

The resultant mixture weighing 1267 grams and analyzing by weight approximately 1.0% toluene, 63.0% benzyl chloride, 33.0% benzal chloride, 2% benzotrichloride, and 1% nuclear chlorinated bodies, was transferred to a one liter still equipped with a column having a twenty plate equivalent, a thermometer at the top, reflux and final condensers and receiver. The system was placed under a vacuum regulated for 5 mm. pressure at the receiver and distillation carried out, maintaining a reflux ratio of about 10:1. Three cuts were taken, the first containing benzyl chloride with traces of toluene; the second a mixture of benzyl and benzal chlorides; and the third, benzal chloride. (In commercial practice the first could be adjusted for sale or use as benzyl chloride or retained for rechlorination. The second would be retained for the next still charge.)

The last cut which weighed 330 grams was hydrolyzed with steam under reflux until free of side chain chlorine to give 215 grams of benzaldehyde. The crude benzaldehyde was washed with 3% soda ash solution and then placed in a fractionating still having a fifteen plate equivalent and distilled at a pressure of 50 mm. with a 5:1 reflux ratio. Samples were taken as soon as the distillate ran dry (clear) and found to contain traces of chlorine. Distillation was continued until such traces disappeared when about 40 cc. had distilled over. Receivers were changed and the distillation continued. Distillation was complete without the reappearance of any traces of chlorine. About 170 grams of benzaldehyde "free from chlorine" and assaying about 99.0% were obtained. The head runnings of 42 grams were found to assay 98.1% and to be suitable for use as "technical benzaldehyde."

*Example II*

Ten liters of freshly distilled nitration quality toluene were chlorinated as described in Example I, except that the flow of chlorine was discontinued when the specific gravity reached 1.02 at room temperature. At this point the composition was found to be approximately 44% by weight of toluene, 50% benzyl chloride, 5% benzal chloride, and 1% of benzotrichloride and ring chlorinated bodies.

The chlorinated mixture, weighing 10025 grams, was distilled in equipment similar to that described in Example I. Five cuts were taken guided by specific gravities and temperatures at the head of the column. These cuts represented toluene to be rechlorinated, a mixture of toluene and benzyl chloride to be returned to the next still charge, benzyl chloride suitable for sale as such, a mixture of benzyl and benzal chlorides, and benzal chloride. Weights in grams were respectively 4350, 87, 4920, 155 and 420. Column drain back and residue amounted to 90 grams.

The benzal chloride cut of 420 grams was refractionated through a small high efficiency column to yield 390 grams. Here the vacuum was accurately regulated at 5 mm. and the pure cut taken at a constant temperature. Upon hydrolysis this yielded 252 grams of benzaldehyde.

Fractionation of the latter yielded 240 grams of benzaldehyde free from chlorine.

Various changes and modifications may be made without departing from the spirit and scope of the present invention and it is intended that such obvious changes and modifications be embraced by the annexed claims.

I claim:

1. The process which comprises reacting toluene with chlorine while avoiding contact with metals until no more than about 35% of the toluene has been converted to benzal chloride, distilling the reaction mass to separate the benzal chloride, and hydrolyzing the benzal chloride to benzaldehyde.

2. The process which comprises reacting substantially pure toluene with dry chlorine at elevated temperature while avoiding contact with metals until about 5 to about 35% of the toluene has been converted to benzal chloride at which point substantially none of the toluene has been converted to benzotrichloride, distilling the reaction mass to separate the benzal chloride, and hydrolyzing the benzal chloride to thereby obtain benzaldehyde substantially free from nuclear and side chain chlorinated compounds.

3. The process which comprises refluxing nitration grade toluene with dry chlorine while avoiding contact with metals until about 10 to about 30% of the toluene has been converted to benzal chloride at which point substantially none of the toluene has been converted to benzotrichloride and substantially none of the toluene has been ring chlorinated, distilling the reaction mass to separate the benzal chloride from benzyl chloride and unreacted toluene, and hydrolyzing the benzal chloride to thereby obtain benzaldehyde substantially free from nuclear and side chain chlorinated compounds.

4. The process which comprises refluxing nitration grade toluene with dry chlorine while avoiding contact with metals until about 10 to about 30% of the toluene has been converted to benzal chloride at which point substantially none of the toluene has been converted to benzotrichloride and substantially none of the toluene has been ring chlorinated, distilling the reaction mass to separate the benzal chloride from benzyl chloride and unreacted toluene, hydrolyzing the separated benzal chloride with water to thereby convert said benzal chloride to benzaldehyde, and heating until the benzaldehyde is substantially free of side chain chlorine.

5. The process according to claim 4, including the further steps of separating the benzaldehyde from the water layer, washing the benzaldehyde with alkali, and fractionating to obtain pure benzaldehyde free from nuclear and side chain chlorinated compounds.

6. In the process for obtaining benzaldehyde by chlorinating toluene and hydrolyzing the reaction product, the improvement which comprises effecting the chlorination while avoiding contact with metals terminating said chlorination when no more than about 35% of the toluene has been converted to benzal chloride, distilling the reaction mass to separate benzal chloride, and subjecting said benzal chloride to hydrolysis.

7. In the process for obtaining benzaldehyde by chlorinating toluene and hydrolyzing the reaction product, the improvement which comprises effecting the chlorination while avoiding contact with metals terminating said chlorination when from about 5 to about 35% of the toluene has been converted to benzal chloride, distilling the reaction mass to separate benzal chloride, and subjecting said benzal chloride to hydrolysis.

8. In the process for obtaining benzaldehyde by chlorinating toluene and hydrolyzing the reaction product, the improvement which comprises effecting the chlorination while avoiding contact with metals terminating said chlorination when from about 10 to about 30% of the toluene has been converted to benzal chloride, distilling the reaction mass to separate benzal chloride, and subjecting said benzal chloride to hydrolysis.

References Cited in the file of this patent

UNITED STATES PATENTS 1,878,462  Britton _____ Sept. 20, 1932

FOREIGN PATENTS 82,927  Germany _____ June 12, 1894
116,348  Great Britain _____ June 7, 1918

OTHER REFERENCES

Fieser et al.: "Organic Chemistry," 2nd ed., D. C. Heath & Co., 1950, page 685 relied on.